(12) United States Patent
Nakayama et al.

(10) Patent No.: US 7,126,715 B2
(45) Date of Patent: Oct. 24, 2006

(54) INK JET RECORDING APPARATUS AND CONTROL METHOD THEREFOR

(75) Inventors: Toru Nakayama, Kanagawa (JP); Souhei Tanaka, Kanagawa (JP); Masafumi Wataya, Kanagawa (JP); Noriyuki Suzuki, Tokyo (JP); Akira Kuronuma, Kuronuma (JP); Takuji Katsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 10/347,928

(22) Filed: Jan. 22, 2003

(65) Prior Publication Data

US 2003/0142163 A1 Jul. 31, 2003

(30) Foreign Application Priority Data

Jan. 30, 2002 (JP) .............................. 2002-021773

(51) Int. Cl.
*G06F 15/00* (2006.01)
*G06K 1/00* (2006.01)

(52) U.S. Cl. ........................ 358/1.16; 710/22; 347/5; 347/9

(58) Field of Classification Search ............... 358/1.16, 358/1.15, 426.05; 347/20, 19, 5, 9; 710/22, 710/52
See application file for complete search history.

(56) References Cited

U.S. PATENT DOCUMENTS

| 4,313,124 | A | 1/1982 | Hara | 346/140 R |
|---|---|---|---|---|
| 4,345,262 | A | 8/1982 | Shirato et al. | 346/140 R |
| 4,459,600 | A | 7/1984 | Sato et al. | 346/140 R |
| 4,463,359 | A | 7/1984 | Ayata et al. | 346/1.1 |
| 4,558,333 | A | 12/1985 | Sugitani et al. | 346/140 R |
| 4,608,577 | A | 8/1986 | Hori | 346/140 R |
| 4,723,129 | A | 2/1988 | Endo et al. | 346/1.1 |
| 4,740,796 | A | 4/1988 | Endo et al. | 346/1.1 |
| 5,570,464 | A * | 10/1996 | Fuse | 358/1.5 |
| 6,754,733 | B1 * | 6/2004 | Hansen | 710/22 |
| 6,793,312 | B1 * | 9/2004 | Ohde | 347/19 |
| 2002/0118408 | A1 | 8/2002 | Nakayama et al. | 358/514 |
| 2003/0201740 | A1 * | 10/2003 | Katsu et al. | 318/254 |
| 2006/0039032 | A1 * | 2/2006 | Tanaka | 358/1.15 |

FOREIGN PATENT DOCUMENTS

| JP | 54-56847 | 5/1979 |
|---|---|---|
| JP | 59-123670 | 7/1984 |
| JP | 59-138461 | 8/1984 |
| JP | 60-71260 | 4/1985 |

\* cited by examiner

*Primary Examiner*—Kimberly Williams
*Assistant Examiner*—Dillon Murphy
(74) *Attorney, Agent, or Firm*—Fitzpatrick, Cella, Harper & Scinto

(57) ABSTRACT

A recording apparatus for recording with use of a recording head having two nozzle arrays arranged side-by-side includes first, second, and third direct memory access (DMA) units, a data converter unit for converting first image data stored in a work buffer into second image data, a record buffer unit for storing the second image data, a latch unit for storing the second image data in a transfer buffer, a buffer reading control table unit, and a DMA control unit for causing transfer processing to be executed by the first, second, and third DMA units based on a flag in the buffer reading control table unit when the image data stored in the work buffer is transferred to the transfer buffer.

10 Claims, 9 Drawing Sheets

INK JET RECORDING APPARATUS AND CONTROL METHOD THEREFOR

BACKGROUND OF THE INVENTION

1. Field of the Invention

The present invention relates to an ink jet recording apparatus and a control method therefor.

2. Description of the Related Art

A serial ink-jet recording apparatus (serial ink-jet printer) in the related art in which a recording operation is performed while a carriage having a recording head moves in the moving direction thereof (main scanning direction) includes a buffer memory. The buffer memory is configured so as to be wider in the main scanning direction than a medium on which data is recorded (hereinafter referred to as "recorded medium") and to be as wide as or wider than the recording head in the direction in which the recorded medium is fed (sub-scanning direction).

As record data, which is stored in the buffer memory, is transferred to the recording head, the recording head is scanned in the main scanning direction so that the data is printed on the recorded medium.

If the record data contains a sequence of null data in the direction in which the recorded medium is fed, the so-called "null skip" control is performed so as to store the record data in which the null data is skipped so as not to store the null data in the record buffer.

In a mechanism for increasing the recording density at which an image is recorded using a recording head with a predetermined recording density (for example, 600 dots per inch (dpi)) in the sub-scanning direction, two nozzle arrays are staggered in the main scanning direction so as to interpose nozzles in one array between nozzles in the other array. For example, when two 600-dpi recording heads are shifted with respect to each other by 1200 dpi, the nozzles give a resolution of 1200 dpi in a staggered array in the sub-scanning direction.

However, when two nozzle arrays are arranged side-by-side, a complex control operation is required for storing the record data corresponding to each nozzle in the buffer memory.

Specifically, the data arranged in the direction of the nozzle arrays are read in a predetermined unit (for example, 32-bit raster data), and is divided into 16-bit raster data to be distributed to each of the two nozzle arrays to allocate the data to each of the nozzles.

Furthermore, the null skip processing must be performed in data units corresponding to the actual arrangement of nozzles.

SUMMARY OF THE INVENTION

It is an object of the present invention to provide an ink jet recording apparatus and a control method for the ink jet recording apparatus by which the foregoing problem is overcome.

In an aspect of the present invention, an ink jet recording apparatus for recording data using a recording head includes a work buffer for storing first image data received from a host device; and a transfer buffer for storing second image data which is to be transferred to the recording head. The ink jet recording apparatus further includes a data converting unit for converting the first image data stored in the work buffer into the second image data; a first direct memory access (DMA) unit for transferring the first image data from the work buffer to the data converting unit; a record buffer for storing the second image data; a second DMA unit for transferring the second image data from the data converting unit to the record buffer; a latch for storing the second image data which is to be stored in the transfer buffer; a third DMA unit for transferring the second image data from the record buffer to the latch; a buffer reading control table for the work buffer to which a flag corresponding to data of the work buffer is written; and a DMA control unit for causing transfer processing to be executed by the first, second, and third DMA units based on the flag when the image data stored in the work buffer is transferred to the transfer buffer.

In another aspect of the present invention, a control method of an ink jet recording apparatus for recording data using a recording head is provided. The ink jet recording apparatus includes a work buffer for storing first image data received from a host device; a record buffer for storing second image data; a transfer buffer for storing the second image data which is to be transferred to the recording head; and a buffer reading control table for the work buffer in which a flag corresponding data of the work buffer is written. The control method includes a first direct memory access (DMA) step of reading the first image data from the work buffer; a data converting step of converting the first image data stored in the work buffer into the second image data; a second DMA step of transferring the second image data converted in the data converting step to the record buffer; a third DMA step of reading the second image data from the record buffer, which is to be stored in the transfer buffer; a latch step of storing the second image data read in the third DMA step; and a DMA control step of causing the first, second, and third DMA steps to be executed based on the flag when the image data stored in the work buffer is transferred to the transfer buffer.

Further objects, features and advantages of the present invention will become apparent from the following description of the preferred embodiments with reference to the attached drawings.

DESCRIPTION OF THE PREFERRED EMBODIMENTS

Some embodiments of the present invention are described below in detail with reference to the accompanying drawings.

Figure 1:
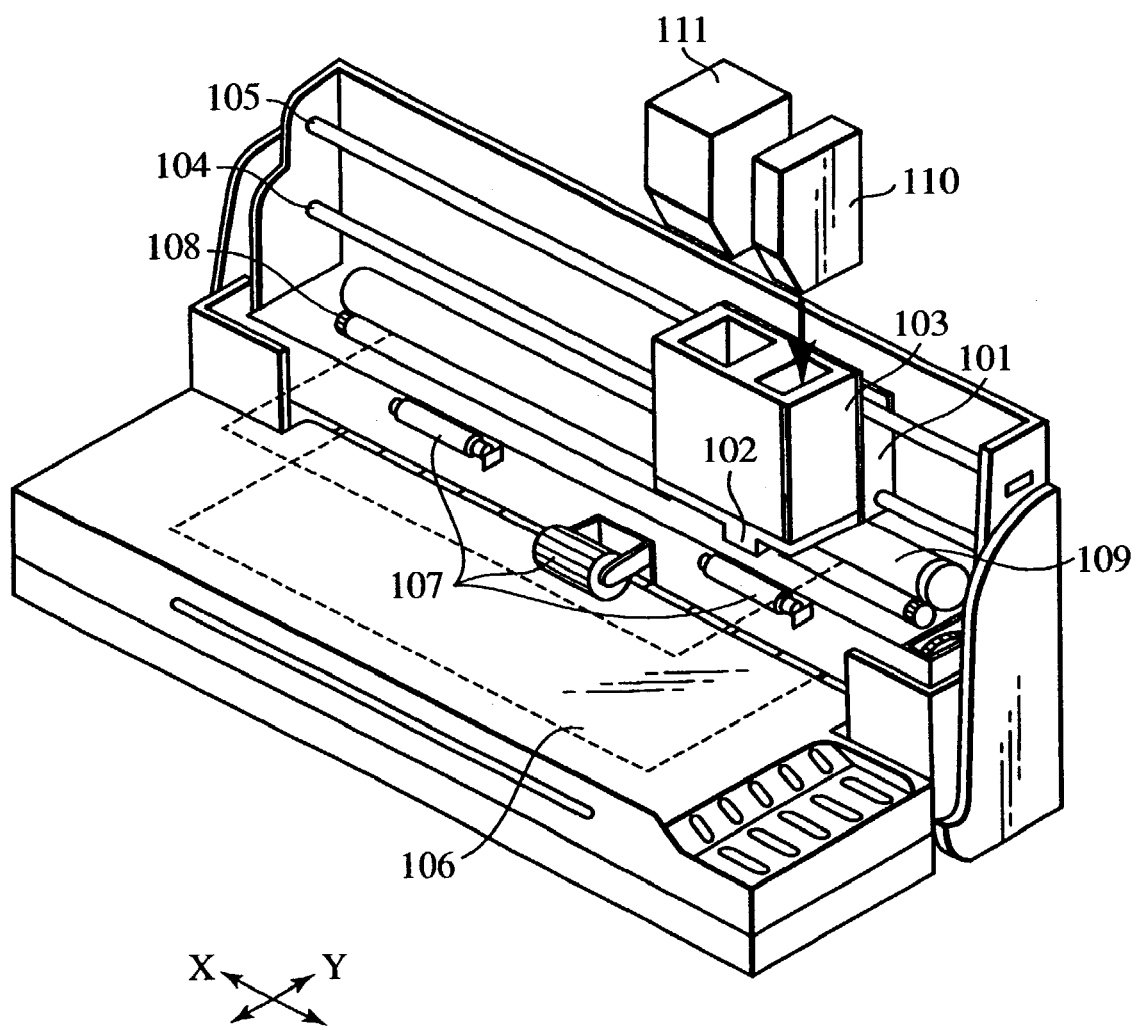
FIG. 1 is a perspective view of an ink jet recording apparatus according to embodiments of the present invention.

FIG. 1 is a perspective view of an ink jet recording apparatus (ink jet printer) according to the embodiments of the present invention discussed below. The ink jet printer shown in FIG. 1 can be either a color printer or a monochrome printer. If the ink jet printer shown in FIG. 1 is a monochrome printer, the printer includes a recording head with an ink cartridge containing black ink, as described below.

As shown in FIG. 1, a carriage 101 carries a recording head 102 and a cartridge guide 103. When the recording head 102 is a monochrome (black) head, black (K) ink is ejected. When the recording head 102 is a color head, cyan (C), magenta (M), yellow (Y), and black (K) inks are ejected. Regardless of whether the recording head 102 is a monochrome head or a color head, nozzles for each color are arranged in a staggered array. In the embodiments of the present invention, two nozzle arrays consisting of an even nozzle array having even-numbered nozzles and an odd nozzle array having odd-numbered nozzles are provided for each color. The two arrays of nozzles allow the nozzles in one array to be interposed between the nozzles in the other array.

When the recording head 102 is a color head, the recording head 102 carries an ink cartridge 110 containing black ink and an ink cartridge 111 containing three-color ink. Cyan (C), magenta (M), yellow (Y), and black (K) inks are supplied from the corresponding ink cartridges 110 and 111. A driving signal for each of the nozzles of the recording head 102 is supplied via a flexible cable (not shown) having a plurality of conducting wires.

The carriage 101 is carried on two guide rails 104 and 105. An endless belt 109 connected with the carriage 101 is driven by a carrier motor described below to move the carriage 101 in a reciprocating manner in the X direction (hereinafter referred to as a "main scanning direction"). A feed roller 108 is driven by a feed motor described below to feed a medium on which data is recorded (hereinafter referred to as "recorded medium") 106 in the Y direction (hereinafter referred to as a "sub-scanning direction"). Reference numeral 107 represents an auxiliary roller.

Figure 2:
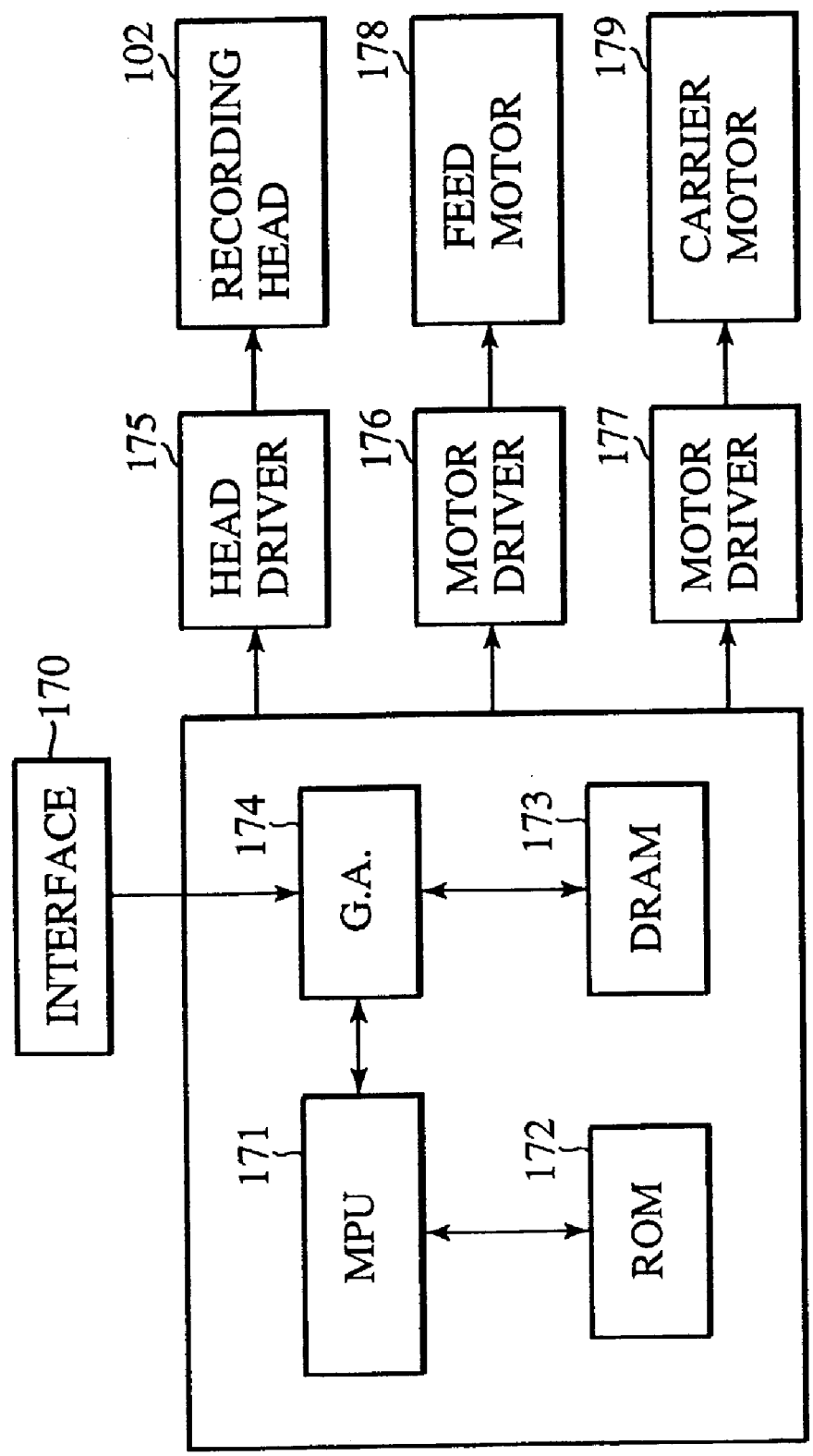
FIG. 2 is a block diagram of a control circuit of the ink jet recording apparatus.

FIG. 2 is a block diagram of a control circuit of the ink jet printer. In FIG. 2, an interface 170 receives record data from an external device such as a host computer. A ROM (read-only memory) 172 stores a control program (including a character font, if necessary) which is executed by an MPU (microprocessor unit) 171. A RAM (random access memory) 173 temporarily stores various data (including the above-described record signal and the record data supplied to the recording head 102), and is implemented by, for example, a DRAM (dynamic RAM). A gate array 174 controls a recording operation of the recording head 102, and controls data transfer between the interface 170, the MPU 171, and the RAM 173. A carrier motor 179 drives the recording head 102 to move in the main scanning direction. A feed motor 178 is used to feed the recorded medium 106 (shown in FIG. 1). A head driver 175 drives the recording head 102. A motor driver 176 drives the feed motor 178, and a motor driver 177 drives the carrier motor 179.

Figure 8:
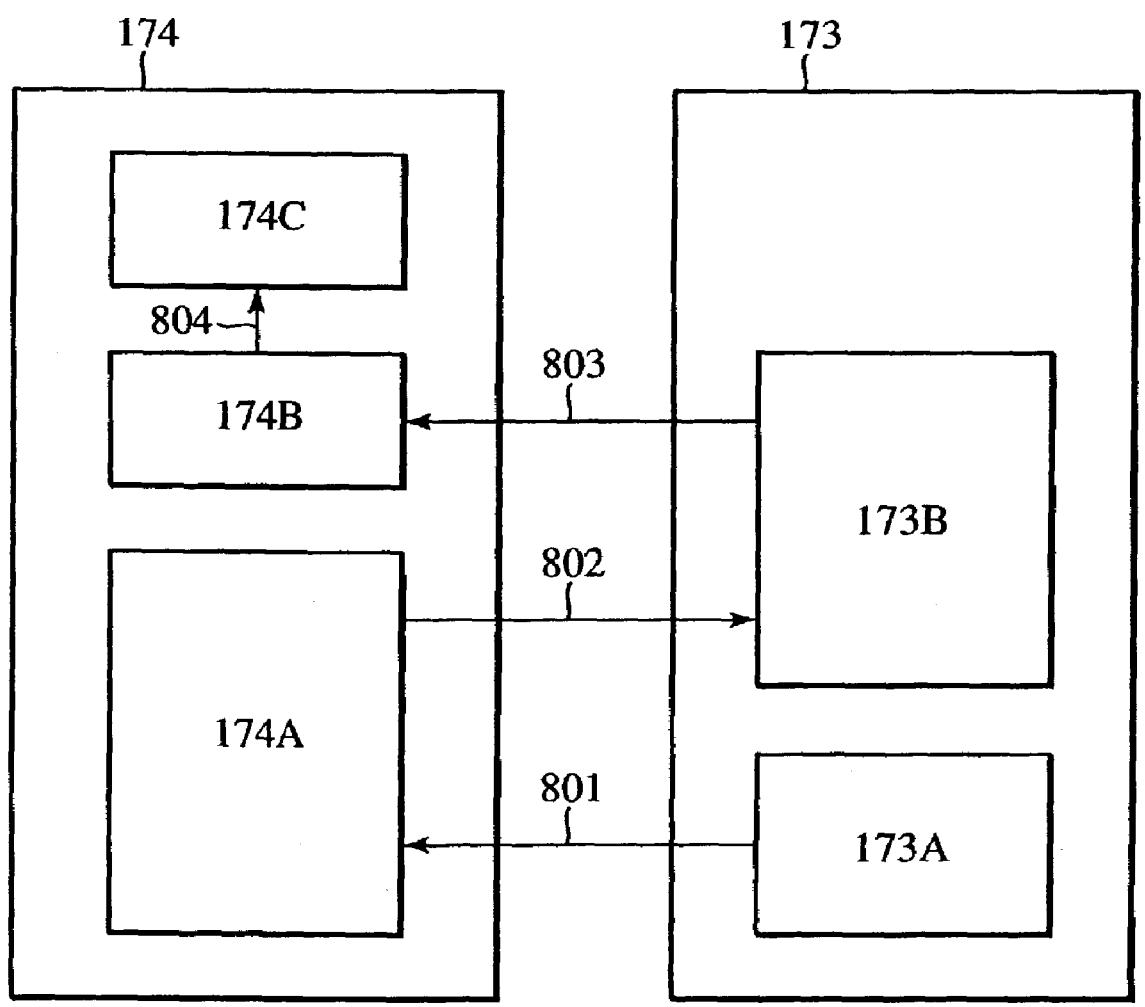
FIG. 8 is an illustration of data transfer between a RAM and a gate array.

A detailed description of data transfer of the record data between the RAM 173 and the gate array 174 is given with reference to FIG. 8.

The RAM 173 includes a work buffer 173A and a record buffer 173B, and the gate array 174 includes an HV converter circuit 174A, a latch 174B, and a transfer buffer 174C.

A DMA (direct memory access) transfer of data in 16-bit units is performed via DMA buses 801 to 803. A single DMA system is dedicated to the DMA buses 801 to 803. Thus, data is not transferred simultaneously via the DMA buses 801 to 803, but is transferred via any of the DMA buses 801 to 803. The data stored in the latch 174B is transferred to the transfer buffer 174C via a data line 804.

The data in the work buffer 173A is DMA transferred to the HV converter circuit 174A to convert the data in a raster form into data in a column form. The resulting data is then DMA transferred to the record buffer 173B. The data stored in the record buffer 173B is DMA transferred to the latch 174B, and is further passed to the transfer buffer 174C. The data is then transferred from the transfer buffer 174C to the recording head 102.

Each time a data transfer to the transfer buffer 174C is completed, the latch 174B clears the data in the latch 174B to zero to be ready for the next data transfer.

While 16-bit data is transferred to the latch 174B via the DMA bus 803, the latch 174B latches the 16-bit data in 8-bit units. A latch timing is determined according to a head-data writing control table described below.

Figure 9:
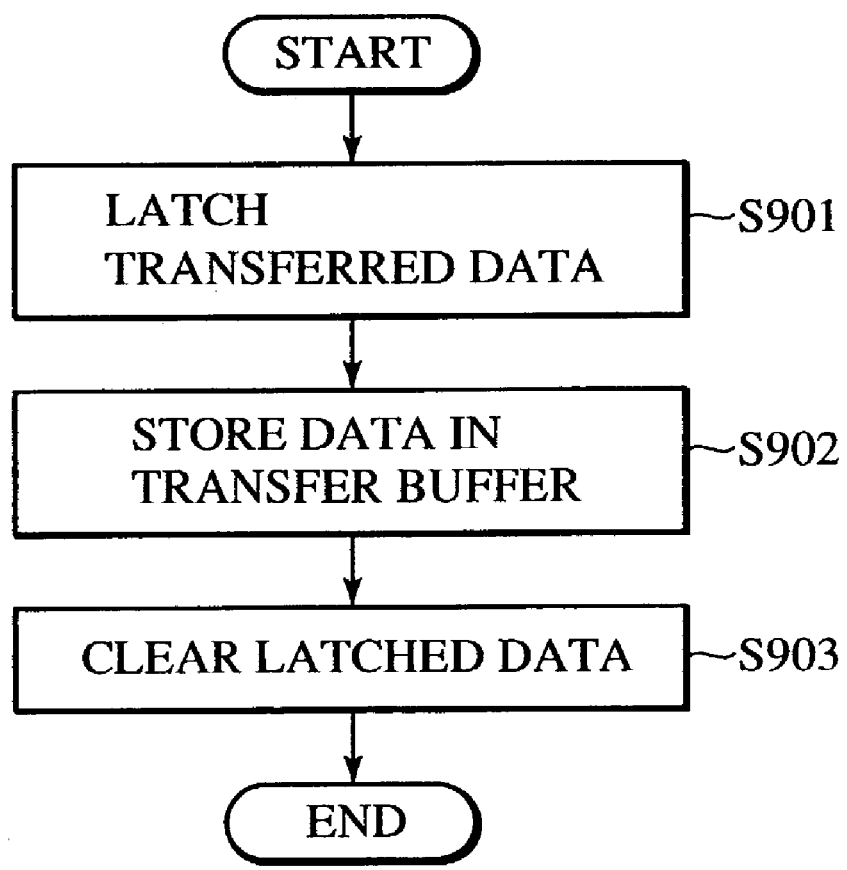
FIG. 9 is a flowchart for the process routine of a latch.

FIG. 9 is a flowchart for the process routine of the latch 174B. Each time data is transferred from the record buffer 173B to the latch 174B, the process routine is executed.

In step S901, the transferred data is latched. In step S902, the latched data is stored in the transfer buffer 174C. In step S903, the latched data is cleared.

In summary, during an operation of the ink jet printer according to the present invention, record data received via the interface 170 is stored in the work buffer 173A of the DRAM 173, and is then converted by the data converter circuit 174A of the gate array 174. The converted data is transferred to the record buffer 173B, followed by the transfer buffer 174C. The motor drivers 176 and 177 are driven, and the head driver 175 is driven in response to the converted data supplied to the head driver 175, thereby causing ink to be discharged from the recording head 102. As the carriage 101 carrying the recording head 102 moves in the main scanning direction, the data is recorded on the recorded medium 106.

First Embodiment

In a first embodiment of the present invention, the recording head 102 is implemented as a monochrome recording head, and the ink jet printer according to the present invention is therefore a monochrome printer for recording a monochrome image or character on the recorded medium 106.

Figure 3:
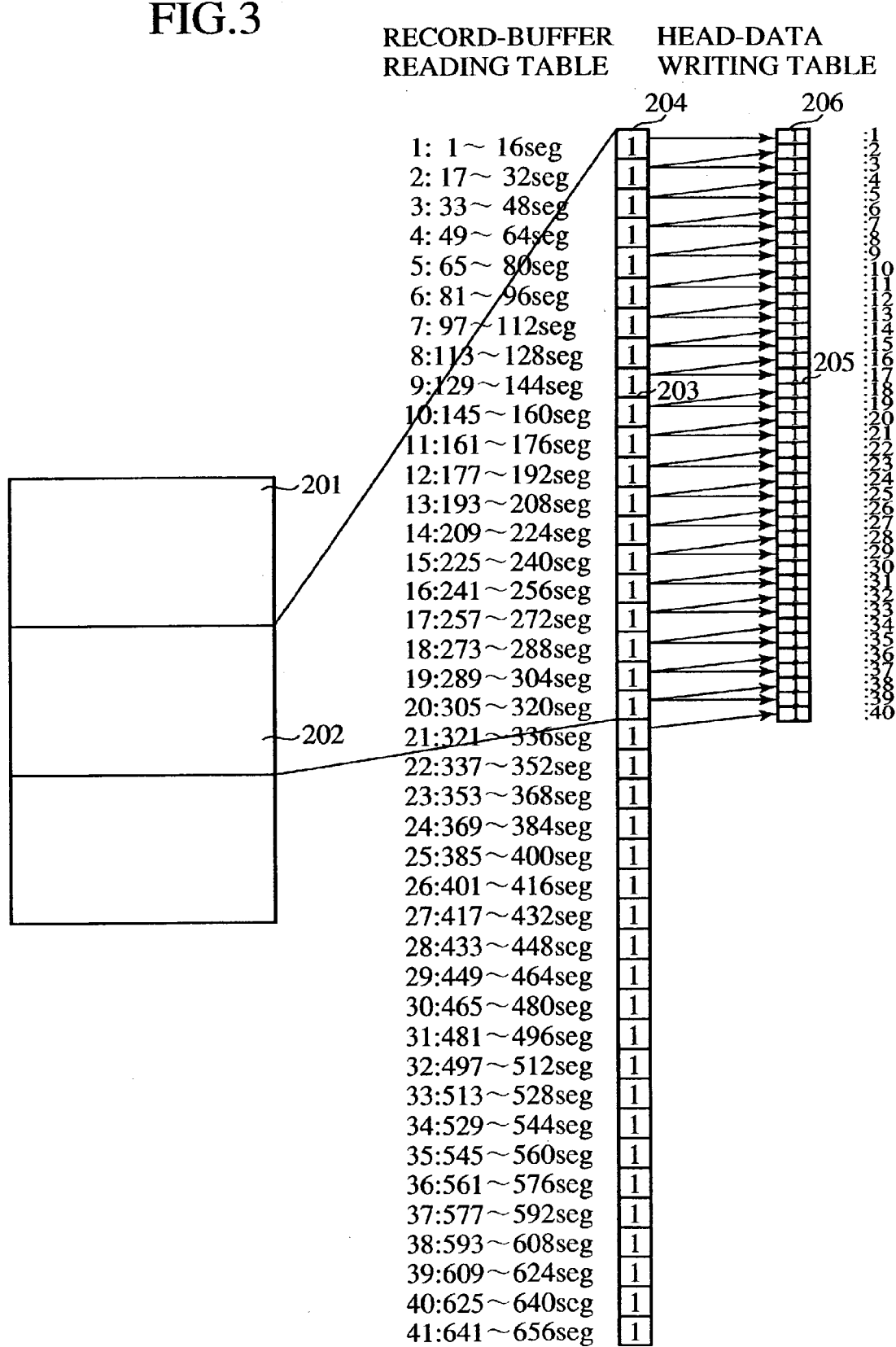
FIG. 3 is an illustration of a printable area of the recorded medium, a zone in which data is recorded for one scan, and control tables according to a first embodiment of the present invention.

FIG. 3 illustrates a printable area 201 and a one-scan-recording zone 202 of the recorded medium 106. The one-scan-recording zone 202 is a zone in which data is recorded for each scan of the recording head 102 in the main scanning direction. In the first embodiment, for recording in the one-scan-recording zone 202, a plurality of record buffers are used to temporarily store data to be recorded on the recorded medium 106, as described below in detail. A buffer reading control table 203, shown in FIG. 3, manages the plurality of record buffers.

A flag indicating the presence of a record buffer, in which value "1" is set, or a flag indicating the absence of a record buffer, in which value "0" is set, is contained in each column 204 of the buffer reading control table 203. In the first embodiment, 20 record buffer area blocks are used for one-scan recording, and the buffer reading control table 203 has 41 columns, i.e., column 1 (1 to 16seg) through column 41 (641 to 656seg). The buffer reading control table 203 has a ring structure for use in a repeated manner.

A head-data writing control table 205 is used to control a transfer of data to be recorded on the recorded medium 106 to the recording head 102. A flag indicating the presence of head data, in which value "1" is set, or a flag indicating the absence of head data, in which value "0" is set, is contained in each column 206 of the head-data writing control table 205. In the first embodiment, 40 head data area blocks are used for one-scan recording, and the head-data writing control table 205 has 40 columns. The head-data writing control table 205 has a straight structure for use in a single scan. Each column 206 of the head-data writing control table 205 corresponds to each nozzle block of the recording head 102.

The recording head 102 has 320 nozzles arranged in the sub-scanning direction, and the buffer reading control table 203 can manage record buffers required for two scans of the recording head 102.

Figure 4:
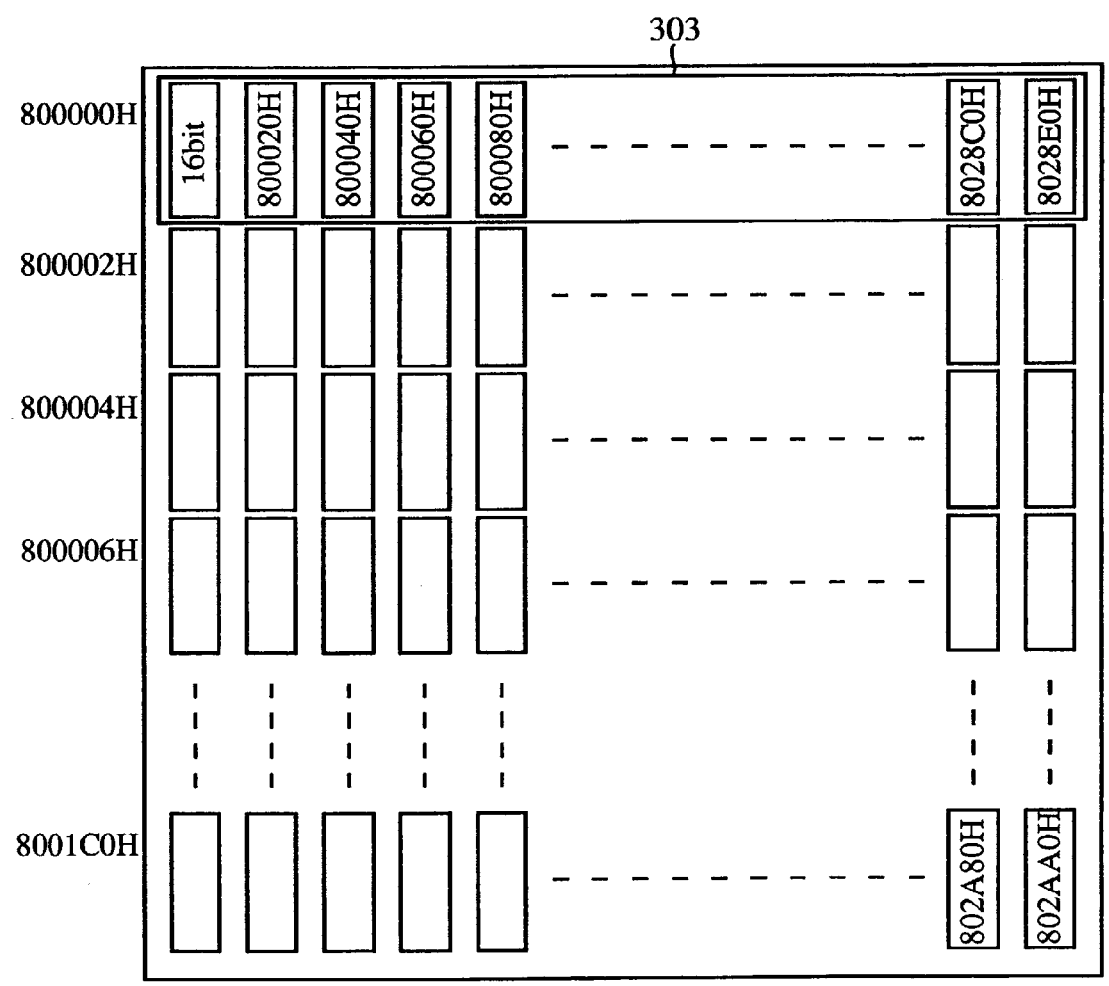
FIG. 4 is an illustration of internal components of a record buffer according to the first embodiment.

FIG. 4 illustrates internal components of each record buffer. A record buffer required for one-scan recording includes a data writing area 303 in which data having a memory capacity necessary for recording data that has 16 bits (one word) in the sub-scanning direction on a medium of A4 size (with a recording width of 210 mm) at a recording density of 600 dpi in the main scanning direction, i.e., 10-kilobyte data, is written.

The record buffers are designated by unique buffer ID numbers (0, 1, 2, . . . , and N). As shown in FIG. 4, memory address "800000 (H: hexadecimal expression)" of the DRAM 173 is used as the start address of each record buffer. The memory area of the DRAM 173 is divided into sequential sections, and one record buffer is allocated to each of the divided sections. When the memory allocation is performed in a sequential manner from the start address, the beginning address of a record buffer having an arbitrary ID number in the RAM 173 is expressed by 800000 (H)+ID number×2 (H).

In order to manage the position of a used record buffer, the RAM 173 is provided with a beginning buffer ID storage area for managing the ID number of the next record buffer. The ID numbers stored in the beginning buffer ID storage area are updated in turn by writing the record data in the record buffers, and the ID number of the next record buffer is set at any point at any time. During the recording operation, therefore, the record buffer in which the data should be written is constantly managed. Information indicating the foregoing processing is stored during the recording operation, and the record buffers are periodically used many times.

Figure 5:
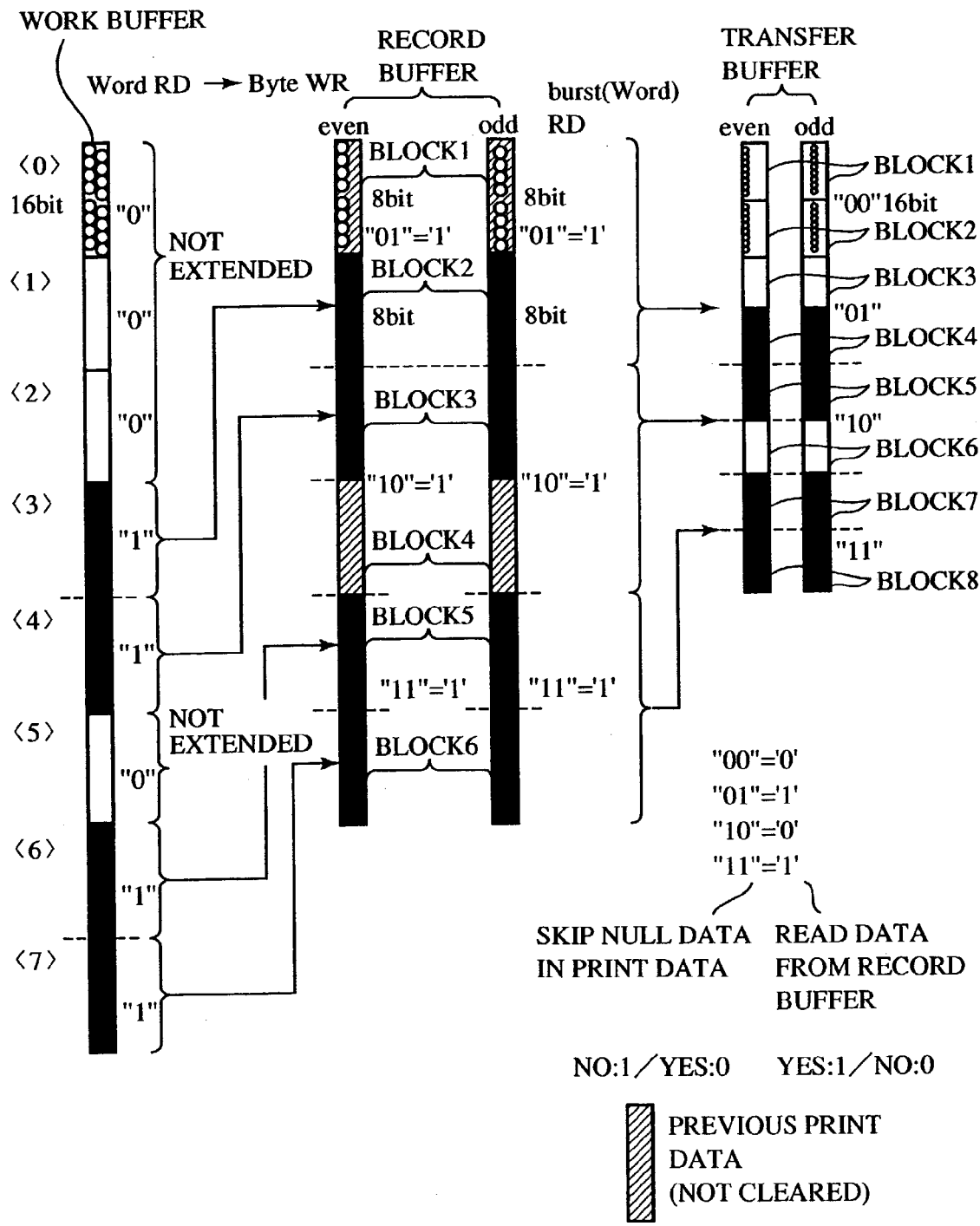
FIG. 5 is an illustration of a group of used nozzles in a recording head and control tables according to the first embodiment.

FIG. 5 illustrates processing of record data, which is printed out on the recorded medium 106, based on a buffer reading control table and a head-data writing control table.

FIG. 5 shows a work buffer, two record buffers, and two transfer buffers. The work buffer stores raster record data in 16-bit units in the direction of the nozzle arrays (in the sub-scanning direction). The record buffers store the record data corresponding to the odd-numbered nozzles and the record data corresponding to the even-numbered nozzles in 8-bit units in the direction of the nozzle arrays (in the sub-scanning direction) in column form corresponding to the odd and even nozzle arrays of the recording head 102. The transfer buffers store the record data corresponding to the odd-numbered nozzles and the record data corresponding to the even-numbered nozzles in 8-bit units in the direction of the nozzle arrays (in the sub-scanning direction).

In FIG. 5, the work buffer has eight blocks arranged in the sub-scanning direction, each of the record buffers has six blocks arranged in the sub-scanning direction, and each of the transfer buffers has eight blocks arranged in the sub-scanning direction. Since no data is contained in block <0> and block <1> of the work buffer, the data with two blocks omitted is stored in each of the record buffers.

Before the data is transferred from the record buffers to the transfer buffers, the data is latched by a latch (not shown).

The data is read in 16-bit units from the work buffer, and the data is written in 8-bit units to the record buffers, and is transferred in 8-bit units to the transfer buffers. The 16-bit record data read from the work buffer is converted into record data in the format corresponding to the nozzle arrays before being written to the record buffers. The data is separated into two groups of even-address data and odd-address data, which are then stored as 8-bit data in the even-address record buffer and the odd-address record buffer, respectively. Ink is discharged from the even nozzle array of the recording head 102 according to the even-address data, and is discharged from the odd nozzle array of the recording head 102 according to the odd-address data.

The data in the buffer reading control table is checked in a predetermined unit (which is equal to two, in this example). If data indicates "0", the data is not read from the work buffer, or is not written to the record buffers. That is, the transfer operation from the work buffer is skipped or omitted.

Since all data stored in block <0> and block <1> of the work buffer is null data (that is, all data is set to zero), both values of the buffer reading control table are set to zero. Thus, the data is not read from block <0> and block <1> of the work buffer, or is not stored in the record buffers. The head-data writing control table indicates "00", so that no data is transferred from the record buffers to the transfer buffers.

Since all data stored in block <2> of the work buffer is null data (that is, all data is set to zero), and data is contained in block <3> of the work buffer, the buffer reading control table indicates "0" and "1" (the head-data writing control table indicates "01"). The data is not read from block <2> of the work buffer since the buffer reading control table indicates "0", while the data is read from block <3> of the work buffer to transfer the data stored in block <3> of the work buffer since the buffer reading control table indicates "1".

The data stored in block <3> of the work buffer is designated by DATA3, the data DATA3ODD is stored in block 2 of the odd-record buffer, and the data DATA3EVEN is stored in block 2 of the even-record buffer. The data DATA3ODD is passed to block 4 of the odd-address transfer buffer, and the data DATA3EVEN is passed to block 4 of the even-address transfer buffer, so that ink is discharged from the corresponding nozzles in the nozzle arrays according to the data DATA3ODD and DATA3EVEN of the respective transfer buffers.

Since data is contained in block <4> of the work buffer, and all data stored in block <5> of the work buffer is null data (that is, all data is set to zero), the buffer reading control table indicates "1" and "0", and the head-data writing control table indicates "10". As in block <2> of the work buffer, no data transfer is performed from the work buffer to the record buffers. As in block <3> of the work buffer, the data is read from block <4> of the work buffer, and the data DATA4ODD and DATA4EVEN are passed to block 3 of the record buffers, and are further passed to block 5 of the transfer buffers.

Since data is contained in block <6> and block <7> of the work buffer, the buffer reading control table indicates "1" and "1", and the head-data writing control table indicates "11". The data is read from block <6> and block <7> of the work buffer.

The data is read from block <6> of the work buffer, and the data DATA6ODD and DATA6EVEN are passed to block 5 of the record buffers, and are further passed to block 7 of the transfer buffers. The data is read from block <7> of the work buffer, and the data DATA7ODD and DATA7EVEN are passed to block 6 of the record buffers, and are further passed to block 8 of the transfer buffers.

In this way, the data in the buffer reading control table is checked in a predetermined unit (which is equal to two, in this example). If data indicates "0", the data is not read from the work buffer, or is not written to the record buffers. Thus, the data is omitted and the remaining data is stored in the record buffers. This operation eliminates excessive data processing.

In the first embodiment, according to the latch process shown in FIG. 9, the data is transferred from the odd-address record buffer to the odd-address transfer buffer, and is also transferred from the even-address record buffer to the even-address transfer buffer.

Therefore, the record data is transferred to the recording head 102 based on the values of the buffer reading control table and the values of the head-data writing control table, thus preventing excessive transfer processing to facilitate the null skip processing.

Second Embodiment

In a second embodiment of the present invention, the recording head 102 is implemented as a color recording head, and the ink jet printer according to the present invention is therefore a color printer for recording a color image or character on the recorded medium 106.

Figure 6:
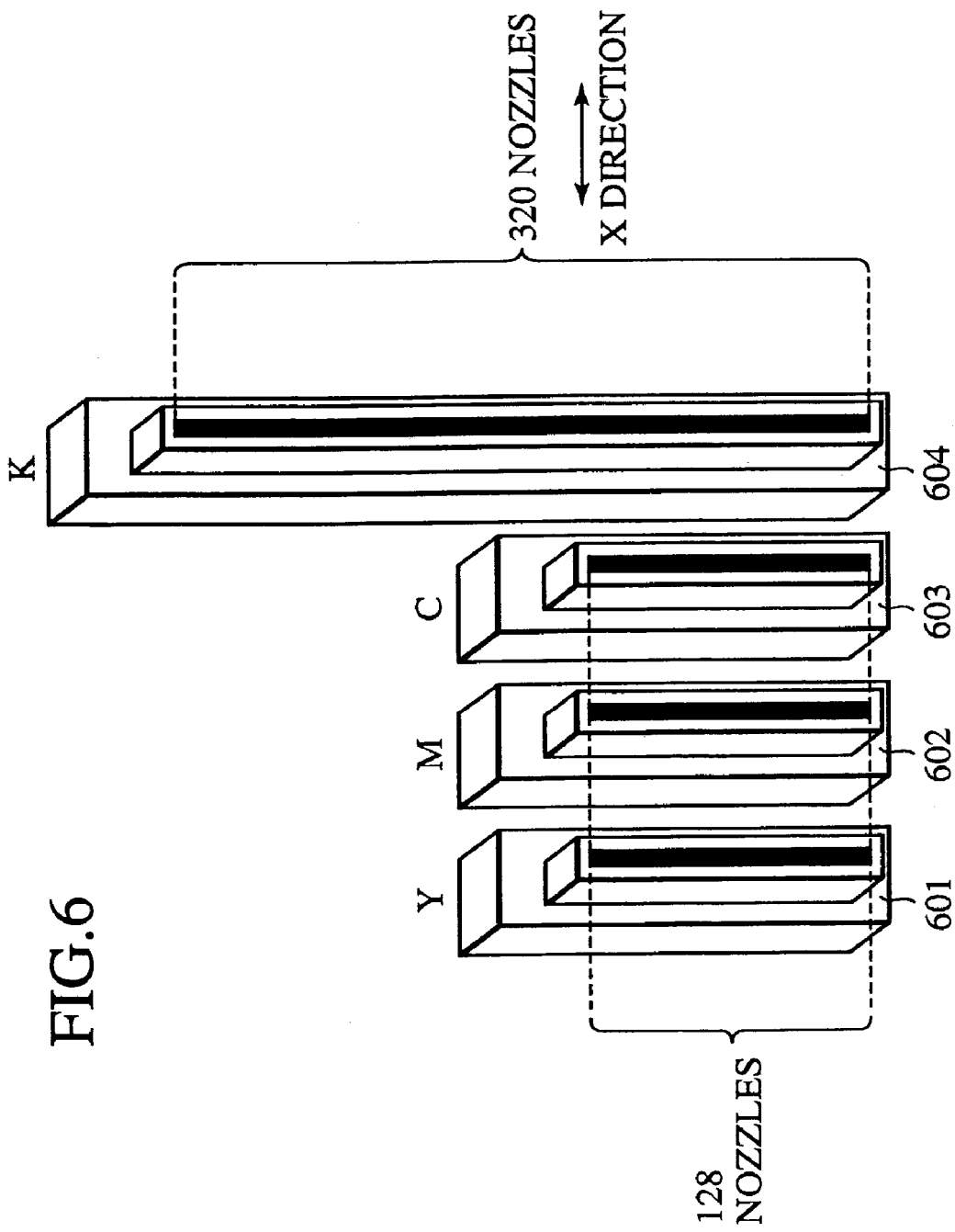
FIG. 6 is a perspective view of a color recording head according to a second embodiment of the present invention, as viewed from a medium on which data is recorded.

FIG. 6 is a perspective view of the color recording head 102 according to the second embodiment, as viewed from the recorded medium 106. In FIG. 6, yellow ink is discharged from a head (hereinafter referred to as a "Y head") 601, magenta ink is discharged from a head (hereinafter referred to as an "M head") 602, cyan ink is discharged from a head (hereinafter referred to as a "C head") 603, and black ink is discharged from a head (hereinafter referred to as a "K head") 604. The Y, M, C, and K heads 601 to 604 are arranged side-by-side in the main scanning direction. Ink drops can be discharged simultaneously from the Y, M, C, and K heads 601 to 604 to form a color character and image on the recorded medium 106. Each of the Y, M, and C heads 601 to 603 has 128 nozzles for ejecting ink drops, and the K head 604 has 320 nozzles for ejecting ink drops.

Figure 7:
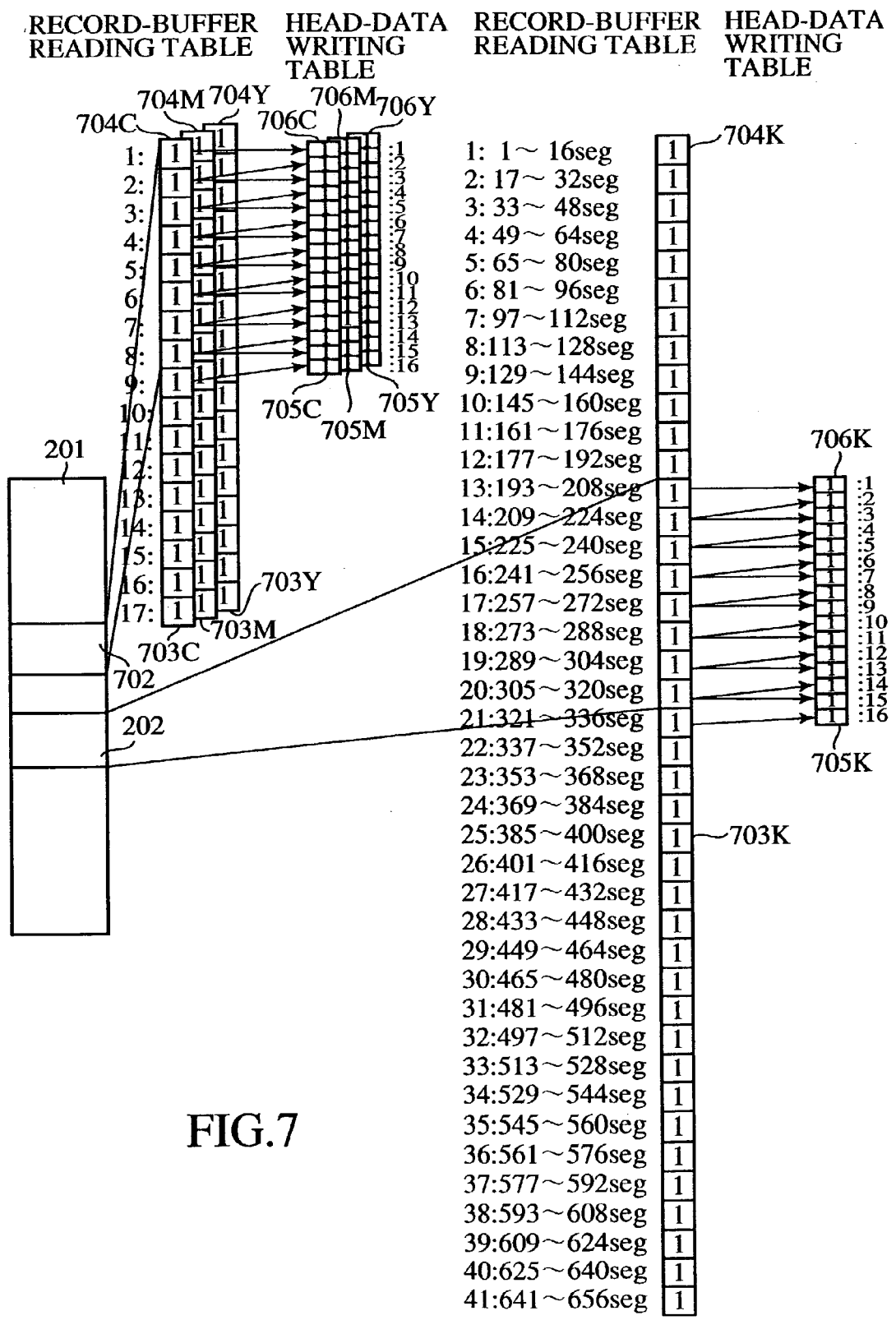
FIG. 7 is an illustration of a printable area of the recorded medium, a zone in which cyan, magenta, and yellow inks are printed for one scan of the recording head, a zone in which black ink is printed for one scan of the recording head in the medium, and control tables according to the second embodiment.

FIG. 7 illustrates a printable area 201 and one-scan-recording zones 202 and 702 of the recorded medium 106. The one-scan-recording zone 702 is a zone in which cyan, magenta, and yellow inks are printed for one scan of the recording head 102 in the main scanning direction. The one-scan-recording zone 202 is a zone in which black ink is printed for one scan of the recording head 102 in the main scanning direction. In the second embodiment, for recording in the one-scan-recording zones 202 and 702, a plurality of record buffers are used to temporarily store data to be recorded on the recorded medium 106. The plurality of record buffers are managed by four buffer reading control tables 704Y, 704M, 704C, and 704K corresponding to the Y, M, C, and K heads shown in FIG. 6. As in the first embodiment, a flag indicating the presence of a record buffer or a flag indicating the absence of a record buffer is contained in each column of the buffer reading control tables 704Y, 704M, 704C, and 704K. In the second embodiment, each of buffer reading control tables 704Y, 704M, and 704C for the color ink, i.e., cyan, magenta, and yellow inks, has 17 columns, and the buffer reading control table 704K for black ink has 41 columns, i.e., column 1 (1 to 16seg) through column 41 (641 to 656seg). Each of the buffer reading control tables 704Y, 704M, 704C, and 704K has a ring structure for use in a repeated manner.

Since each of the Y, M, and C heads 601 to 603 for cyan, magenta, and yellow inks has 128 nozzles arranged in the sub-scanning direction, and the K head 604 for black ink has 320 nozzles arranged in the sub-scanning direction, the buffer reading control tables 704Y, 704M, 704C, and 704K can manage record buffers required for two scans of the recording head 102.

Head-data writing control tables 705Y, 705M, 705C, and 705K are used to control a transfer of data to be recorded on the recorded medium 106 to the recording head 102. As in the first embodiment, a flag indicating the presence of head data or a flag indicating the absence of head data is contained in each of columns 706Y, 706M, 706C, and 706K of the head-data writing control tables 705Y, 705M, 705C, and 705K.

In the second embodiment, 16 head data area blocks are used for one-scan recording, and the head-data writing control tables 705Y, 705M, 705C, and 705K each have 16 columns. Each of the head-data writing control tables 705Y, 705M, 705C, and 705K has a straight structure for use in a single scan. The columns 706Y, 706M, 706C, and 706K of the head-data writing control tables 705Y, 705M, 705C, and 705K correspond to the nozzle blocks of the recording head 102.

The record buffers are designated by unique buffer ID numbers (0, 1, 2, . . . , and N). As shown in FIG. 4, memory address "800000 (H: hexadecimal expression)" of the DRAM 173 is used as the start address of each record buffer. The memory area of the DRAM 173 is divided into sections in 10-kilobyte units, and one record buffer is allocated to each of the divided sections. When the memory allocation is performed in a sequential manner from the start address, the beginning address of a record buffer having an arbitrary ID number in the RAM 173 is expressed by, for example, 800000 (H)+ID number×2 (H) for cyan, 900000 (H)+ID number×2 (H) for magenta, A00000 (H)+ID number×2 (H) for yellow, and B00000 (H)+ID number×2 (H) for black.

In order to manage the order of record buffers to be used, as in the first embodiment, the RAM 173 is provided with a beginning buffer ID storage area for managing the ID number of the next record buffer for each color. The processing similar to that in the first embodiment is performed, and a description thereof is thus omitted.

In the second embodiment, processing of record data based on the buffer reading control table and the head-data writing control table is performed in the manner similar to that in the first embodiment (see FIG. 5). Although a monochrome recording head is used in the first embodiment, a color recording head is used in the second embodiment, in which two nozzle arrays are provided for each color, and a record buffer and a transfer buffer are provided for each color so that the processing is performed for each color.

The latch process in the second embodiment is similar to that in the first embodiment. In the second embodiment, the data is transferred to an odd-address transfer buffer and an even-address transfer buffer for each of yellow, cyan, magenta, and black. A latch is commonly used for processing the color data. For example, yellow data is first transferred, followed by magenta, cyan, and black data in order.

In the second embodiment in which a color recording head is used, therefore, the record data is transferred to the recording head 102 based on the values of the buffer reading control table and the values of the head-data writing control table, thus preventing excessive transfer processing to facilitate the null skip processing.

In the foregoing description of the ink jet printer taken in conjunction with the first and second embodiments, image data are processed in 16-bit units and 8-bit units. However, the present invention is not limited to these data units. For example, as far as an access from the MPU is performed with ease and the null skip control is optimally performed, other numbers of bits may be available.

The number of flags in the buffer reading control table or the head-data writing control table is not limited to the number discussed in the foregoing description. Although the number of flags in the control table sufficient for two scans is used in the foregoing description, the number of flags sufficient for more than two scans (for example, the number of scans for one page) may also be used.

It is understood that the number of print buffers or the print buffer size is not limited to the values discussed in the foregoing description, but a variety of modifications may be made depending upon the device configuration and the like.

The present invention has been discussed in the context of an ink jet recording apparatus, in particular, a printing apparatus which includes a system for generating thermal energy as energy for causing ink to be discharged, such as electro-thermal transducers or laser beams, such that the thermal energy causes a change in the state of ink. Such a system achieves high-density and high-resolution recording.

A typical structure and operation of the system is disclosed in U.S. Pat. No. 4,723,129 or No. 4,740,796, and is preferably used. Although this system is suitable for both so-called on-demand and continuous ink jet recording apparatuses, it is suitable for an on-demand ink jet recording apparatus, in particular. In the on-demand ink jet apparatus, electro-thermal transducers are provided for sheets or liquid passages which contain liquid (ink), and one or more driving signals corresponding to record information are applied to the electro-thermal transducers so that a rapid temperature rise occurs in excess of a temperature at which a film boiling phenomenon occurs. This causes the electro-thermal transducers to generate thermal energy, and film boiling occurs on a heating surface of a recording head. As a result, bubbles are produced in the liquid (ink) in one-to-one correspondence with the driving signals. As the bubbles grow or shrink, the liquid (ink) is expelled from discharge outlets to form one or more liquid (ink) drops. Preferably, the driving signals are applied in the form of pulses since bubbles instantaneously and suitably grow or shrink in response to the driving signals, and the response time of discharging the liquid (ink) is reduced.

A suitable pulse driving signal is disclosed in U.S. Pat. No. 4,463,359 or No. 4,345,262. The recording operation would further be improved using conditions as to the rate of temperature increase of the heating surface, as described in U.S. Pat. No. 4,313,124.

In addition to a recording head disclosed in the above-listed publications which includes a combination of discharge outlets, liquid passages, and electro-thermal transducers (linear liquid passages or rectangular liquid passages), a recording head disclosed in U.S. Pat. No. 4,558,333 or No. 4,459,600 in which the heating surface is positioned in a bent portion is also encompassed by the present invention. The present invention may also encompass a recording head disclosed in Japanese Patent Laid-Open No. 59-123670 in which a slot common to a plurality of electro-thermal transducers is used as a discharge outlet in the electro-thermal transducers, and a recording head disclosed in Japanese Patent Laid-Open No. 59-138461 in which openings used for absorbing pressure waves caused by thermal energy are formed in correspondence with discharge outlets.

A replaceable chip recording head which is electrically connected with the main body of the recording apparatus or is supplied with ink from the main body when the recording head is attached to the main body, or a cartridge recording head which is integrally formed with an ink tank may also be used.

In the recording apparatus of the present invention, preferably, the recording head is provided with a recovery device, a preliminary auxiliary device, and the like, whereby the advantages of the present invention would be more reliably obtained. More specifically, these devices include a capping unit and a cleaning unit for the recording head, a pressuring or suction unit, and a pre-heating unit having electro-thermal transducers, other heating elements, or combinations thereof. A preliminary discharging mode for discharging for the purpose other than the recording purpose would also be advantageous for stable recording.

The present invention may be applied to a recording apparatus capable of not only a monochrome recording operation using only one major color such as black, but also at least one of multi-color and full-color mode recording operations using different colors or mixed colors, irrespective of whether the recording head is formed of a single integral unit or a combination of multiple heads.

In the foregoing embodiments, ink is referred to as liquid; however, ink that is solid at room temperature or lower, or ink that is fluid or liquid at room temperature also may be used. In an ink jet method, generally, ink is subjected to temperature control in a range of 30° C. to 70° C. so as to maintain the ink viscosity for which the ink is stably discharged. Therefore, ink should be liquid when a used record signal is applied.

Furthermore, in order to utilize a temperature rise caused by thermal energy as energy which causes a change in the state of ink from the solid state to the liquid state, or in order to prevent ink evaporation, ink which is solid in a normal state and which is rendered liquid by heating may be used. According to the present invention, ink which is rendered liquid by applying thermal energy according to record signals so that liquid ink can be discharged, or ink which is not rendered liquid until thermal energy is applied, such as ink which remains solid at the time when the ink reaches the recorded medium, may also be used. As disclosed in Japanese Patent Laid-Open No. 54-56847 or No. 60-71260, the ink which is kept in cavities or through-holes in porous sheets as liquid or solid material may face electro-thermal transducers. In the present invention, the above-described system using film boiling is most suitable for these types of ink.

The present invention may be applied to ink jet recording apparatuses installed in a copying machine combined with a reader or the like, or in a facsimile machine having transmission/reception capabilities, in addition to those used as image output terminals for information processors such as computers.

The present invention may be applied to a system configured by a plurality of devices or a system configured by a single device. It is also understood that the present invention may be applied to a mechanism achieved by providing a program for the system or the device or devices.

According to the present invention, therefore, data is processed in data units suitable for the arrangement of nozzle arrays, so that efficient processing of record data including null skip processing can be performed with ease.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink jet recording apparatus for recording data using a recording head, comprising:
   a work buffer means for storing first image data received from a host device;
   at least one transfer buffer means for storing second image data which is to be transferred to the recording head;
   a data converting means for converting the first image data stored in said work buffer means into the second image data;
   a first direct memory access means for transferring the first image data from said work buffer means to said data converting means;
   at least one record buffer means for storing the second image data;
   a second direct memory access means for transferring the second image data from said data converting means to said record buffer means;
   a latch means for storing the second image data which is to be stored in said transfer buffer means;
   a third direct memory access means for transferring the second image data from said record buffer means to said latch means;
   a buffer reading control table means for said work buffer means to which a flag corresponding to data of said work buffer means is written; and
   a direct memory access control means for causing transfer processing to be executed by said first, second, and third direct memory access means based on the flag when the image data stored in said work buffer means is transferred to said transfer buffer means.

2. The ink jet recording apparatus according to claim 1, wherein, when a predetermined number of flags corresponding to data of said work buffer means indicates no data for the transfer processing by said first direct memory access means, said direct memory access control means omits the transfer of data corresponding to the flag from said work buffer means.

3. The ink jet recording apparatus according to claim 1, wherein said direct memory access control means causes the transfer processing to be executed by said third direct memory access means based on the value of the flag and the number of flags.

4. The ink jet recording apparatus according to claim 1, wherein said latch means clears the latched data to zero after the data is stored in said transfer buffer means.

5. The ink jet recording apparatus according to claim 1, wherein said work buffer means has a plurality of blocks in first data units, and each of said record buffer means, said latch means, and said transfer buffer means has a plurality of blocks in second data units.

6. The ink jet recording apparatus according to claim 1, wherein the recording head includes a plurality of nozzle arrays each having a plurality of nozzles, the nozzle arrays being arranged in the direction in which the recording head scans.

7. The ink jet recording apparatus according to claim 6, wherein the ink jet recording apparatus includes a plurality of record buffer means and a plurality of transfer buffer means so as to correspond to the nozzle arrays.

8. The ink jet recording apparatus according to claim 7, wherein said latch means latches in turn the second image data stored in said record buffer means.

9. The ink jet recording apparatus according to claim 1, wherein the recording head is a recording head for discharging ink by using thermal energy, and the recording head includes a transducer for generating thermal energy which is applied to the ink.

10. A control method for controlling an ink jet recording apparatus for recording data using a recording head, the ink jet recording apparatus including:
   a work buffer means for storing first image data received from a host device;
   a record buffer means for storing second image data;
   a transfer buffer means for storing the second image data which is to be transferred to the recording head; and
   a buffer reading control table means for the work buffer means to which a flag corresponding data of the work buffer means is written,
   the control method comprising:
   a first direct memory access step, of reading the first image data from the work buffer means;
   a data converting step, of converting the first image data stored in the work buffer means into the second image data;
   a second direct memory access step, of transferring the second image data converted in the data converting step to the record buffer means;
   a third direct memory access step, of reading the second image data from the record buffer means, which is to be stored in the transfer buffer means;
   a latch step, of storing the second image data read in the third direct memory access step; and
   a direct memory access control step, of causing the first, second, and third direct memory access steps to be executed based on the flag when the image data stored in work buffer means is transferred to the transfer buffer means.

* * * * *

UNITED STATES PATENT AND TRADEMARK OFFICE
CERTIFICATE OF CORRECTION

PATENT NO. : 7,126,715 B2
APPLICATION NO. : 10/347928
DATED : October 24, 2006
INVENTOR(S) : Toru Nakayama et al.

It is certified that error appears in the above-identified patent and that said Letters Patent is hereby corrected as shown below:

ON THE TITLE PAGE [75]:

Inventors, "Akira Kuronuma, Kuronuma (JP);" should read --Akira Kuronuma, Tokyo (JP);--.

Signed and Sealed this

Third Day of April, 2007

JON W. DUDAS
*Director of the United States Patent and Trademark Office*